W. E. MILLER.
DEVICE FOR PREVENTING BACKFLOW IN WATER SUPPLY SYSTEMS.
APPLICATION FILED APR. 23, 1913.

1,105,991.

Patented Aug. 4, 1914.

2 SHEETS—SHEET 1.

Witnesses.

Inventor.

W. E. MILLER.
DEVICE FOR PREVENTING BACKFLOW IN WATER SUPPLY SYSTEMS.
APPLICATION FILED APR. 23, 1913.

1,105,991.

Patented Aug. 4, 1914.

2 SHEETS—SHEET 2.

Witnesses.

Inventor.
Walter E. Miller.
By W. J. FitzGerald
Attorneys.

UNITED STATES PATENT OFFICE.

WALTER E. MILLER, OF MADISON, WISCONSIN.

DEVICE FOR PREVENTING BACKFLOW IN WATER-SUPPLY SYSTEMS.

1,105,991.

Specification of Letters Patent.

Patented Aug. 4, 1914.

Application filed April 23, 1913. Serial No. 763,029.

*To all whom it may concern:*

Be it known that I, WALTER E. MILLER, a citizen of the United States, residing at Madison, in the county of Dane and State of Wisconsin, have invented certain new and useful Improvements in Devices for Preventing Backflow in Water-Supply Systems; and I do hereby declare the following to be a full, clear, and exact description of the invention, such as will enable others skilled in the art to which it appertains to make and use the same.

My invention relates to improvements in devices for preventing back flow in water supply systems.

The ultimate object of the invention is to promptly dispose of any water or other fluid which leaks backward past a check valve placed in a line of pipe for the purpose of preventing a flow in the direction of such leakage, but which may be imperfectly operating.

The immediate object is to provide for the automatic opening and closing of a hydraulically operated gate valve placed in the same line of pipe near to, and in advance of, the check valve, and to automatically close and open a drain valve which holds or releases the hydraulic pressure in the section of pipe intervening between the gate and check valves, according to the state of the pressures in the pipe line on the opposite sides of that section.

With these objects in view, the invention consists in the improved construction, arrangement and combination of the parts of a device of the character specified, which will be hereinafter fully described, and afterward specifically claimed.

Figure 1:
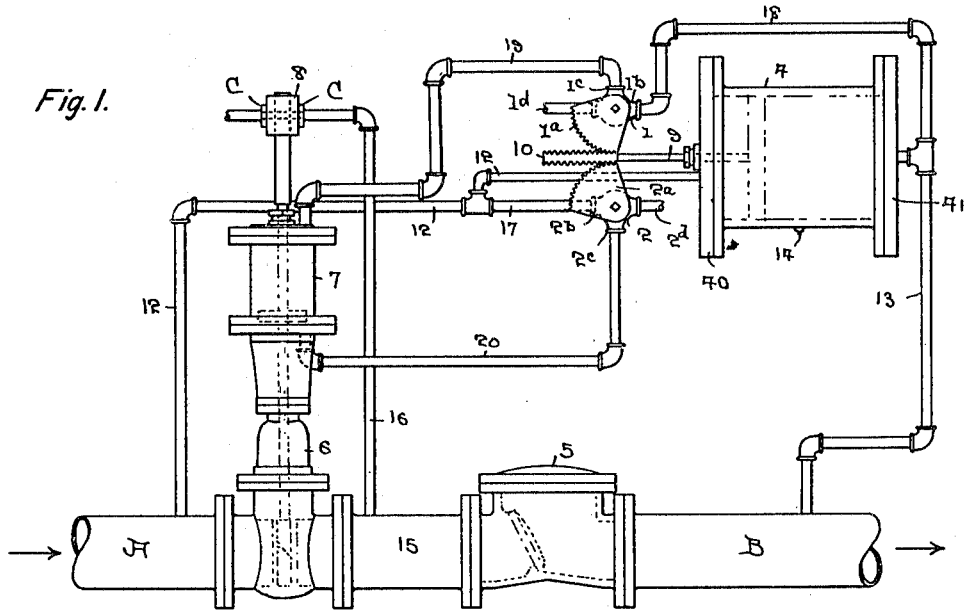
Figure 2:
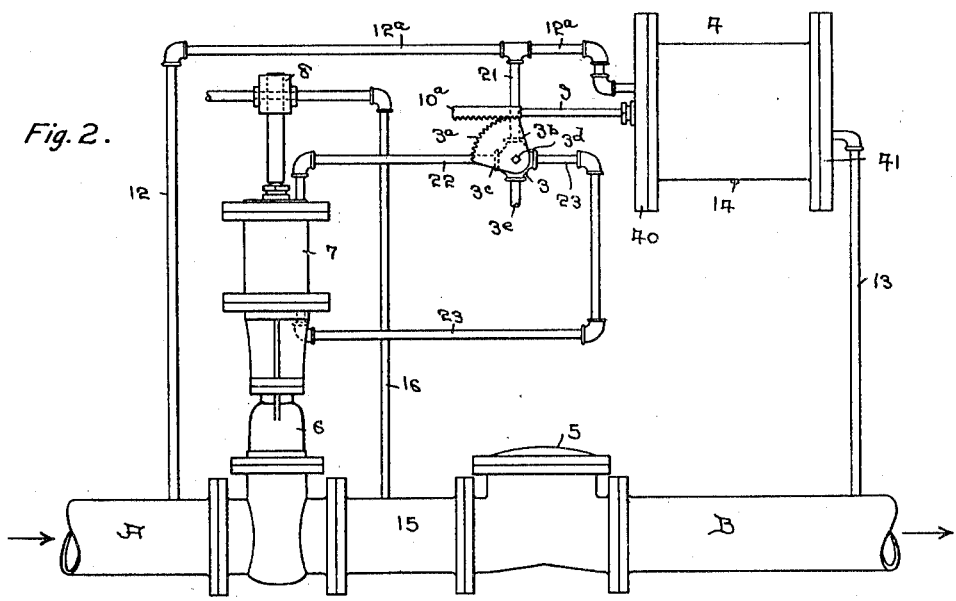
Figure 6:
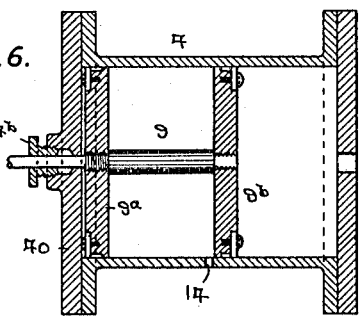
Figure 3:
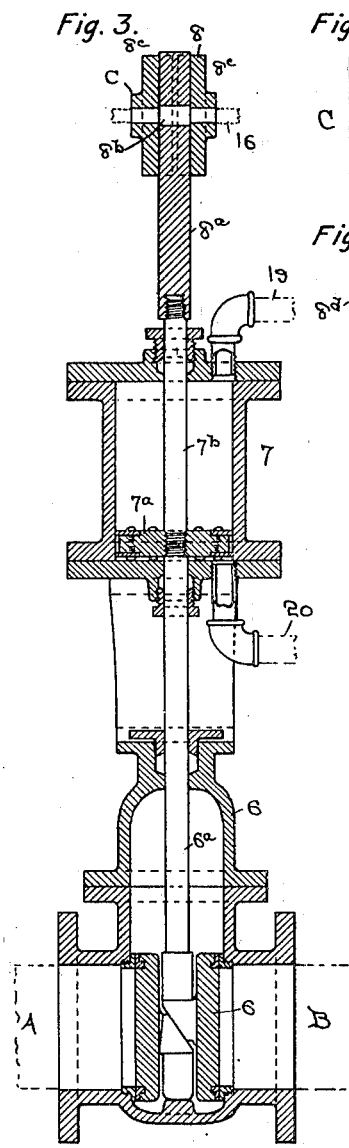
Figure 4:
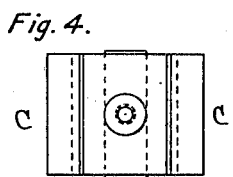
Figure 5:
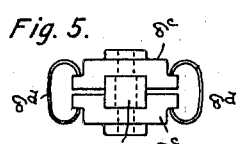
Figure 7:
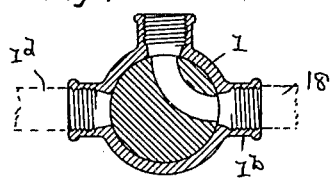
Figure 8:
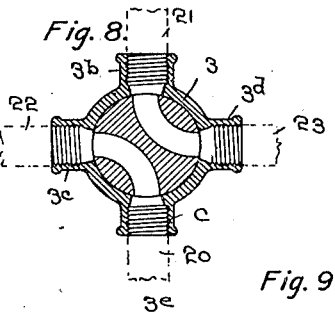
Figure 9:
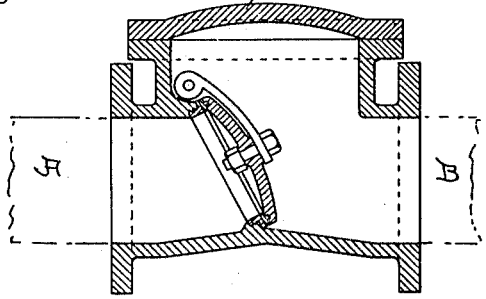

In order that the construction and operation thereof may be readily comprehended, I will now proceed to fully describe my invention in connection with the accompanying drawings, which illustrate an approved embodiment thereof, and in which drawings, Figure 1 represents in elevation, one form of my invention, arranged diagrammatically; Fig. 2 represents similarly, a slightly modified form; Fig. 3 represents a central vertical section, taken longitudinally through the main waterway, illustrating the hydraulically operated gate valve and the drain valve; Fig. 4 represents in side elevation, the same drain valve; Fig. 5 represents a plan view of the same; Fig. 6 represents a central longitudinal section of a power cylinder, with its pistons and portion of its piston rod; Fig. 7 represents a cross section of a common three-way water cock taken on a plane perpendicular to the axis of rotation and through the centers of the waterways; Fig. 8 represents a similar cross section of an ordinary four-way cock; Fig. 9 represents a longitudinal section of a common horizontal swing check valve on a vertical plane through the center of its waterway.

Like reference characters indicate similar parts throughout the several figures.

In Fig. 1, A, B, indicates two sections of a main pipe line on opposite sides of a check valve, 5, placed in said line to prevent a flow or current except in the direction from A toward B. 6 indicates a hydraulically operated gate valve inserted in the same pipe line, and 7 the operating cylinder of the gate valve which cylinder contains a working piston 7$^a$ securely attached to a piston rod 7$^b$ forming an extension of the sliding stem 6$^a$ of the gate valve. 8 indicates a drain valve provided for holding the fluid in or releasing it from the sub-section, 15, of the section A of the main pipe line between the gate valve 6 and check valve 5, said valve 8 being firmly secured in proper position by braces or framework not shown in the drawings being omitted for the simplification and clarification of the illustration. In the type here shown, a bar 8$^a$ attached to and forming an extension of the stem 6$^a$ and piston rod 7$^b$ of the hydraulically operated gate valve, having a port hole 8$^b$ through it, is the valve proper, or working part of the valve 8, the casing of which is made in two parts 8$^c$ and held firmly against the sliding valve by strong clamps, 8$^d$, as shown in Figs. 4 and 5. Any other type of drain valve or water cock capable of being opened with the closing or closed with the opening of the gate valve by a mechanical connection between the valve 8 and some working part of the apparatus is also contemplated, such, for example, as a common two-way clock controlled by the pistons of cylinder 4 in the same manner as the cocks indicated at 1, 2 and 3. 4 indicates a power cylinder having a constantly open vent, 14, at the center of its length, and containing two working pistons 9$^a$, 9$^b$, firmly secured to a single piston rod, 9, at such distance apart that neither piston can pass or cover the vent. The vent is provided as a means of escape for any water which may leak past either piston and so that it may not pass on into the opposite end of the cylinder and circulate where it would be objectionable. This cylinder, 4, is made large enough in diameter to sufficiently multiply the difference between the pressures per unit of area in the sections A and B of the main pipe line, so as to provide a working force adequate to overcome the friction involved in moving the pistons and changing the setting of the cocks hereinafter described. The cylinder 4 is to be firmly secured in any convenient position relative to the pipe line A B. Its piston rod, 9, projects beyond one cylinder head 40, working through a stuffing box $4^b$, in the center thereof. 10 indicates a double rack bar attached to the end of the piston rod, 9. 1 and 2 indicate two ordinary three-way water cocks to be firmly secured in fixed positions relative to each other and to the cylinder 4 by braces or framework, omitted from the drawings, said valves having their stems equipped with gear segments, $1^a$ and $2^a$, which engage the opposite sides of the double rack bar 10. The radii of these gear segments and the length of stroke of the pistons in cylinder 4 are so proportioned as to give the cock centers a rotation limit of 90 degrees. 13 indicates a small pipe connecting one end 41 of the cylinder 4 with the main pipe section B, and 18, a branch from the pipe 13, (or, it might be, an independent pipe), providing a waterway from the main pipe section B to one opening of the cock 1 as at $1^b$. 19 indicates a small pipe connecting a second opening as at $1^c$ of cock 1 with the upper end of the gate valve cylinder, 7. The third outlet $1^d$ of cock 1 is a wasteway for draining the upper end of cylinder 7, and should be connected to a sewer or other place of disposal for waste water. 12 indicates a small pipe connecting the main pipe in section A with the other end 40 of cylinder 4, and 17 either a branch from pipe 12 or an independent pipe connecting the main pipe in section A with one opening $2^b$ of the cock 2. 20 indicates a small pipe connecting a second opening $2^c$ of cock 2 with the lower end of cylinder 7, the third opening $2^d$ of cock 2 being a wasteway for draining the lower end of that cylinder, and should properly be arranged in the same manner as the third opening $1^d$ of cock 1.

In Fig. 2, 3 indicates a single common four-way cock used in place of the two three-way cocks shown in Fig. 1, and, like each of them, has its stem equipped with a gear segment, $3^a$, firmly secured to it. The rack bar $10^a$ may be a single instead of a double rack, but it requires a guide (not shown in the drawing) to hold it constantly engaged with the gear segment $3^a$ of the cock 3. 21 indicates a small pipe connecting one opening $3^b$ of the cock 3 with the pipe $12^a$, through a branch 12 from that pipe, with the main pipe in the section A or pipe 21 might be connected directly with the main pipe. 22 and 23 indicate small pipes connecting two additional and opposite openings $3^c$ and $3^d$ of the cock 3 with the upper and lower ends of cylinder 7. The fourth opening $3^e$ of cock 3 is a common or joint wasteway, or drain connection, serving both ends of cylinder 7 alternately through the cock 3 and the pipes 22 and 23. In all other features the apparatus shown in Fig. 2 is similar to that in Fig. 1. The cock 3 must be firmly secured in a fixed position relative to cylinder 4, by braces or framework not shown in the drawings. In the event of a material diminution of pressure in section A, as in case of the rupture of said section, a backflow from section B is prevented by the check valve 5. The hydraulic pressure in section B being now in excess of that in section A, this excess pressure, transmitted through the pipe B, will act in cylinder 4 to force the piston to the left end of that cylinder. This movement, through the movement of the rack bar 10 and segments $1^a$, $2^a$, sets the two three-way cocks 1 and 2 in Fig. 1 in position to admit water through the pipes 13, 18 and 19 and the cock 1 from section B of the main pipe to the upper end of cylinder 7 and by moving piston $7^a$ down, to discharge any water in the lower end of said cylinder through pipe 20, cock 2 and wasteway $2^d$.

In the construction shown in Fig. 2 excess of pressure in section B of the main pipe over that in section A will, through pipe 13 force the piston in cylinder 4 to the left, and move rack bar $10^a$ far enough to set the four-way valve of Figs. 2 and 8 in position to permit pressure in left hand end of cylinder 4 to pass through pipes $12^a$ and 21, valve 3, and pipe 22, forcing piston $7^a$ downward, the water beneath said piston being thereby forced out through pipe 23, cock 3 and wasteway $3^e$. The gate valve is automatically closed by the downward movement of rod $7^b$ with piston $7^a$ and, the rod $8^a$ moving with said parts, the drain valve 8 is also simultaneously opened, releasing the pressure in subsection 15 of section A of the main pipe, and any water then leaking back from section B of the main pipe past the check valve 5 into subsection 15 will freely escape from said sub-section through pipe 16 and the open drain valve 8. When the pressure in section B falls below that in section A of the main pipe, the excess pressure in section A over that in section B will act in the left end of cylinder 4 to force the pistons to the right. This movement will change the setting of the two three-way cocks 1 and 2 (or the single four-way cock 3) so as to admit water from the main pipe to the lower end of cylinder 7 and release the water in the upper end by which the gate valve 6 will be automatically opened and the drain valve 8 will be simultaneously closed, the usual flow in the main pipe from A to B being then permitted to take place.

What I claim as new and desire to secure by Letters Patent of the United States, is—

1. A pipe line and a check valve therein, in combination with means coöperating with the check valve to inclose a sub-section of the pipe in advance of the valve to receive leakage from the check valve, and a drainage opening from the sub-section automatically opened when said sub-section is inclosed.

2. A pipe line and a check valve therein, in combination with means operated by excess of pressure beyond the check valve and coöperating therewith to inclose a sub-section of the pipe in advance of the valve to receive leakage from the check valve, and a drainage opening from the sub-section automatically opened when said sub-section is inclosed.

3. A pipe line and a check valve therein, in combination with means coöperating with the check valve to inclose a sub-section of the pipe in advance of the valve to receive leakage from the check valve, a drainage opening from the sub-section automatically opened when said sub-section is inclosed, and means for automatically opening the sub-section to the main pipe line.

4. A pipe line and a check valve therein, in combination with means coöperating with the check valve to inclose a sub-section of the pipe in advance of the valve to receive leakage from the check valve, a drainage opening from the sub-section automatically opened when said sub-section is inclosed and means operated by increase of pressure in the pipe line in advance of the inclosed sub-section for automatically opening the sub-section to the main line.

5. A pipe line and a check valve therein, in combination with means coöperating with the check valve to inclose a sub-section of the pipe in advance of the valve to receive leakage from the check valve, a drainage valve opening from the sub-section automatically opened when said sub-section is inclosed and means operated by increase of pressure in the pipe line in advance of the inclosed sub-section for automatically opening the sub-section to the main line, said opening means also automatically closing the drainage valve.

6. A pipe line and a check valve therein in combination with a gate valve in advance of the check valve and coöperating therewith to inclose a sub-section of the pipe line between the two valves, a drainage valve from said sub-section connected to the gate valve to open when the gate valve closes and close when the gate valve opens, and means, operable by variation of pressure in the line in advance of and beyond the check valve to operate the gate valve.

7. A pipe line, a check valve, a gate valve in advance of the check valve, means for operating the gate valve to inclose a sub-section of the pipe line between the two valves, and a drainage valve from the inclosed section, operated simultaneously with the gate valve.

8. A pipe line, a check valve, dividing the line into two sections, a gate valve in advance of the check valve, a cylinder adjacent to the gate valve, a rod forming the stem of the gate valve and continued in said cylinder as a piston rod, a piston on said rod, and means operated by change of pressure in the section of the main line beyond the check valve for reciprocating the piston in the cylinder.

9. A pipe line, a check valve, dividing the line into two sections, a gate valve in advance of the check valve, a cylinder adjacent to the gate valve, a rod forming the stem of the gate valve and continued in said cylinder as a piston rod, a piston on said rod, means operated by change of pressure in the section of the main line beyond the check valve for reciprocating the piston in the cylinder, said means comprising a second power cylinder, a pipe leading from the main line into that cylinder, double pistons in the cylinder, pipes leading into the top and bottom of the gate valve cylinder, a valve in each of those pipes, a pipe leading from the cylinder through one of the valves to the pipe leading to the bottom of the gate valve cylinder, and also to the main line in advance the gate valve, and a pipe leading from the main line at a point beyond the check valve through the other valve to the pipe leading to the top of the gate valve cylinder.

In testimony whereof I have signed my name to this specification in the presence of two subscribing witnesses.

WALTER E. MILLER.

Witnesses:
J. N. BIDNELL,
R. McA. KEOWN.